United States Patent [19]

Kornher et al.

[11] Patent Number: 5,548,301

[45] Date of Patent: Aug. 20, 1996

[54] PIXEL CONTROL CIRCUITRY FOR SPATIAL LIGHT MODULATOR

[75] Inventors: Kevin L. Kornher, Dallas; James L. Conner, Rowlett, both of Tex.

[73] Assignee: Texas Instruments Incorporated, Dallas, Tex.

[21] Appl. No.: 300,356

[22] Filed: Sep. 2, 1994

Related U.S. Application Data

[63] Continuation of Ser. No. 2,627, Jan. 11, 1993, abandoned.

[51] Int. Cl.$^6$ .................................................. G09G 3/34
[52] U.S. Cl. ................................................ 345/85; 345/205
[58] Field of Search ................................ 345/84, 85, 206, 345/205, 132, 55, 147; 348/770, 771

[56] References Cited

U.S. PATENT DOCUMENTS

| | | | |
|---|---|---|---|
| 4,039,890 | 8/1977 | Bailey et al. | 345/206 |
| 4,229,732 | 10/1980 | Hartstein et al. | 345/55 |
| 4,638,309 | 1/1987 | Ott | 345/84 |
| 4,725,832 | 2/1988 | Lorteije et al. | 345/85 |
| 4,736,202 | 4/1988 | Simpson et al. | 345/85 |
| 4,741,599 | 5/1988 | Togo et al. | 345/84 |
| 4,979,738 | 12/1990 | Frederiksen | 345/132 |
| 5,096,279 | 3/1992 | Hornbeck et al. | 348/770 |
| 5,189,406 | 2/1993 | Humphries et al. | 345/147 |

FOREIGN PATENT DOCUMENTS

| | | | |
|---|---|---|---|
| 4116628 | 4/1992 | Japan | G09G 3/36 |
| 9209064 | 5/1992 | WIPO . | |
| 9209065 | 5/1992 | WIPO . | |

*Primary Examiner*—Steven Saras
*Attorney, Agent, or Firm*—Julie L. Reed; James C. Kesterson; Richard L. Donaldson

[57] ABSTRACT

A spatial light modulator (10) having reduced control circuitry as compared to existing devices. Sets of pixel elements (11) share a memory cell (12), such that each memory cell (12) has the same fanout as other memory cells (12). Each pixel element (11) in a set is switched to an on or off state via a reset line (13) that is separate from that of the other pixel elements (11) in that set. Frame data is loaded in split bit-frames during a set time period, such that each split bit-frame contains only the data for pixel elements (11) on one reset line (13). Thus, the same memory cell (12) can be used to deliver data to all pixel elements (11) in its fanout because only one pixel element (11) in the fanout is switched at a time.

6 Claims, 3 Drawing Sheets

5,548,301

PIXEL CONTROL CIRCUITRY FOR SPATIAL LIGHT MODULATOR

This application is a Continuation of application Ser. No. 08/002,627 filed Jan. 11, 1993, which is now abandoned.

RELATED APPLICATIONS

U.S. patent application Ser. No. 08/388,649 filed Feb. 13, 1995.

TECHNICAL FIELD OF THE INVENTION

This invention relates to spatial light modulators, especially those known as deformable mirror devices, and more particularly to circuitry for controlling the on and off states of individual pixel elements.

BACKGROUND OF THE INVENTION

Spatial light modulators (SLMs) consist of an array of electronically addressable pixel elements and related control circuitry. A typical application is for image display, where light from each pixel is magnified and projected to a display screen by an optical system. The type of modulation depends on how the modulator is combined with an optical system.

A frequently used type of SLM is the deformable mirror device (DMD, also known as digital micromirror device), in which each pixel element is a tiny micromechanical mirror, capable of separate movement in response to an electrical input. Incident light may be modulated in direction, phase, or amplitude for reflection from each pixel.

For many applications, the SLM is binary in the sense that each pixel element may have either of two states. The element may be off, which means that it delivers no light. Or, the element may be on, which means that it delivers light at a maximum intensity. To achieve a viewer perception of intermediate levels of light, various pulse width modulation techniques may be used. These techniques are described in pending U.S. patent Ser. No. 07/678,761, entitled "DMD Architecture and Timing for Use in a Pulse-Width Modulated Display System", assigned to the same assignee as the present application.

In general, pulse width modulation produces an integrated brightness by switching each pixel on or off for a period that corresponds to a binary number, during each frame. Pulse width modulation uses various schemes for loading the SLM, such as "bit-frame" loading, in which one bit per pixel for an entire frame is loaded at one time. Each pixel element has a memory cell. The entire array of memory cells is loaded with one bit per cell, then all pixel elements are set to correspond to that bit-frame of data. During the display time of the current bit-frame, data for the next bit-frame is loaded. Thus, for example, for 8-bit pixel brightness quantization, the SLM is loaded eight times per frame, one pixel per frame at a time. In one such method, the most significant bit is displayed for ½ of a frame period, the second most significant bit for ¼ frame period, etc., with the least significant bit (LSB) representing a display time of $½^n$ frame period, for n-bit brightness quantization.

A problem with existing pixel loading techniques is that they require at least one memory cell per pixel element. As the number of pixels per frame increases, the memory requirements for the SLM device results in increased costs and reduced manufacturing yields. A need exists for an SLM that has reduced circuitry for controlling the pixel elements.

Loading schemes that use a memory cell for every pixel element also limit the minimum time in which a pixel element can be set, to the time required to load a bit-frame into the memory array. When pulse width modulation is used, the display time for the LSB is the shortest display time. During this LSB time, the data for the next frame must be loaded. This is the time period when a "peak" data rate is required. To satisfy this peak data rate, a certain pin count and data frequency on those pins must be available. A high peak data rate translates into a high pin count and/or high frequency, which increases device and/or system costs. A need exists for an SLM that reduces this peak data rate.

SUMMARY OF THE INVENTION

A first aspect of the invention is a spatial light modulator (SLM) having individually controlled pixel elements, each of which may be set and reset to either of two states depending on a value of a data signal delivered to that pixel element. The SLM has an array of pixel elements, each having two possible states depending on the value of a data signal delivered to it from an associated memory cell. The SLM also has a number of memory cells, each in data communication with a set of pixel elements. Each memory cell stores a data value representing an on or off state of a pixel element of its set and delivers a signal representing this data value to the pixel elements of its set. A number of reset lines are connected to the pixel elements such that a different reset line is in communication with each pixel element of a set. Thus, the reset lines may be used to reset only one pixel element of a set at a time.

A technical advantage of the invention is that a single memory cell controls a set of multiple pixel elements. This reduces the circuitry per pixel, which has the effect of reducing device cost and increasing manufacturing yields. Also, the peak data rate at which loading must occur is reduced because there are fewer memory cells to load for any one reset. This has the effect of reducing pin-counts and/or lowering data frequency requirements, with the further effect of lower device and/or systems cost.

DETAILED DESCRIPTION OF THE INVENTION

Pixel Array Interconnections

Figure 1:
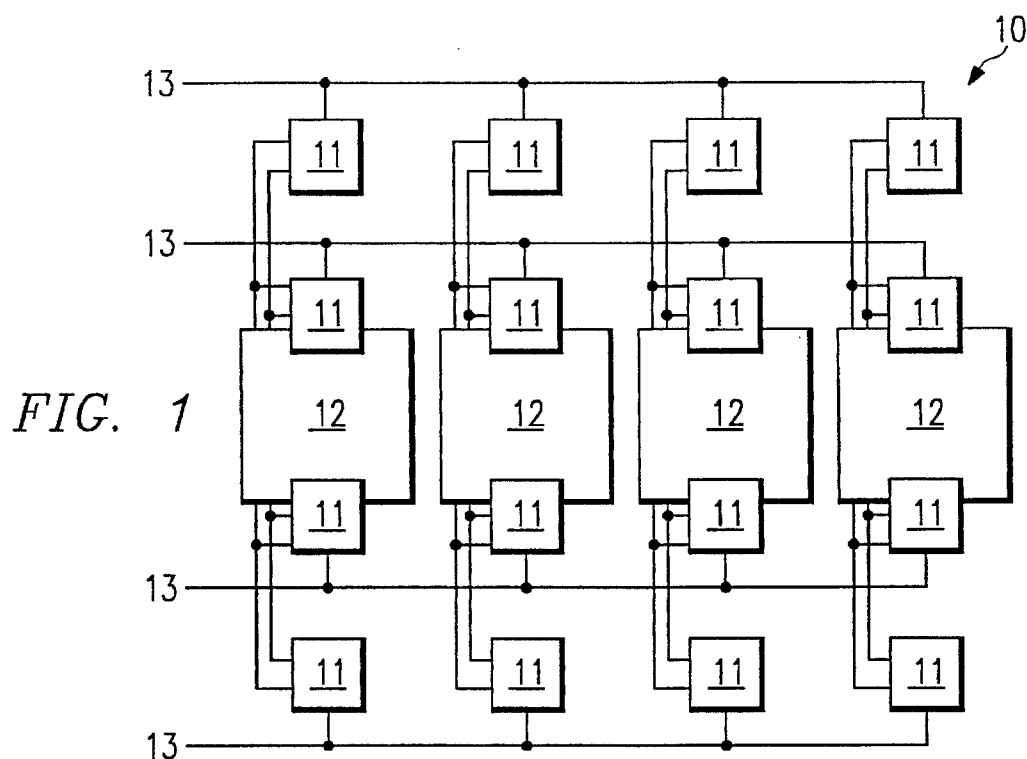
FIG. 1 is a block diagram of a portion of an SLM array, having memory cells with a fanout of four pixel elements.

FIG. 1 is a block diagram of a portion of an SLM array 10, having pixel elements 11 that are controlled with memory cells 12 and reset lines 13. Only a small number of pixel elements 11 with their related control circuitry is shown; a typical SLM array 10 would have thousands of such elements 11. FIG. 1 is primarily intended to show how each memory cell 12 serves multiple pixel elements 11. Additional detail about the interconnections between pixel elements 11, memory cells 12, and reset lines 13 is explained below in connection with FIGS. 2–5.

SLM 10 is, for purposes of this description, a device known as a deformable mirror device (DMD also known as digital micromirror device). DMDs have arrays of tiny micro-mechanical mirror elements, which may be modulated to provide the viewer with a perception of varying intensity. An example of a DMD is the DMD device manufactured by Texas Instruments, Inc. However, the invention is not limited to the use of DMD's for SLM 10, and may be used with other types of SLMs having addressable pixel elements, with similar characteristics, namely, operation in accordance with data signals and a reset control signal, as explained below.

Pixel elements 11 are operated in a bistable mode, which means that there are two stable states. As explained below in connection with FIG. 3, the direction of their movement is controlled by "loading" them with data from their memory cell 12 via address electrodes to "drive" the pixel element 11. As further explained in connection with FIG. 3, the state of the pixel element 11 is changed, in accordance with this driving voltage, by applying a differential bias via a reset electrode. The term "reset signal" is used herein to refer to a signal that is delivered to the pixel elements 11 to cause them to change state.

Pixel elements 11 are grouped into sets of four pixel elements 11, each set in communication with a memory cell 12. The number of pixel elements 11 in a set associated with a single memory cell 12 is referred to as the "fanout" of that memory cell 12. Thus, in FIG. 1, each memory cell 12 has a "fanout" of four pixels. The invention is applicable to other fanout values, but a fanout of four is used herein for purposes of example.

Each memory cell 12 may be a conventional SRAM (static random access memory) cell. One of the advantages of many of today's designs for SLM 10 is that they may be easily integrated onto underlying CMOS control circuitry. This description is in terms of memory cells 12, each having a single bit storage capacity. However, the scope of the invention could also include "memory cells" that store more than one bit or that have additional logic circuitry. For example, each memory cell 12 could have a double buffer configuration.

Four reset lines 13 control the time when the pixel elements 11 change their state. Once all memory cells 12 for the pixel elements 11 connected to a particular reset line 13 have been loaded, the states of the pixel elements 11 change according to the data with which they have been loaded, simultaneously, in response to a reset signal on that reset line 13. In other words, the pixel elements 11 retain their current state as the data supplied to them from their memory cell 12 changes, and until receiving a reset signal.

Each pixel element 11 in the set of four pixel elements associated with a memory cell 12 is connected to a different one of four reset lines 13. Thus, each pixel element 11 in a set can change its state at a different time from that of the other pixel elements 11 in that set.

In general, each set of pixel elements 11 associated with a memory cell 12 has the same number of pixel elements, and this number is the same as the number of reset lines 13. However, there could be instances, such as on edges of the pixel element array, where a memory cell 12 is connected to a fewer number of pixel elements.

Figure 2:
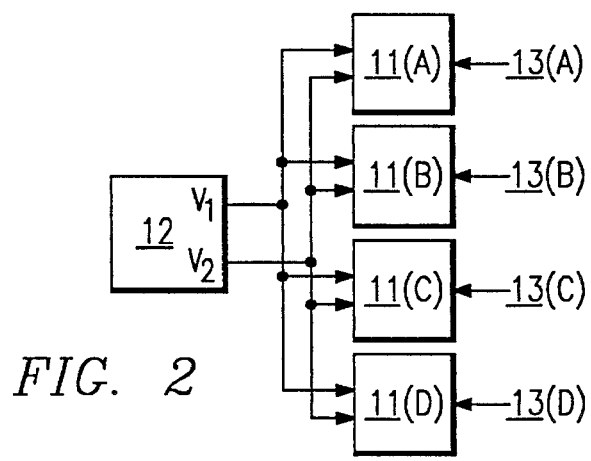
FIG. 2 illustrates a memory cell having a fanout of four pixels.

FIG. 2 illustrates a set of four pixel elements 11, its memory cell 12 and reset lines 13, and the related interconnections. Each pixel element 11 is labeled in terms of the reset line 13 to which it is connected, i.e. pixel element 11(A) is connected to reset line 13(A). As indicated, either a "1" or a "0" value may be delivered to the pixel elements 11. When the memory cell 12 is switched, either of those values is delivered to all pixel elements 11 to which that memory cell 12 is connected. A signal on the reset line 13 of each pixel element 11 determines whether that pixel element 11 will change state.

Figure 3:
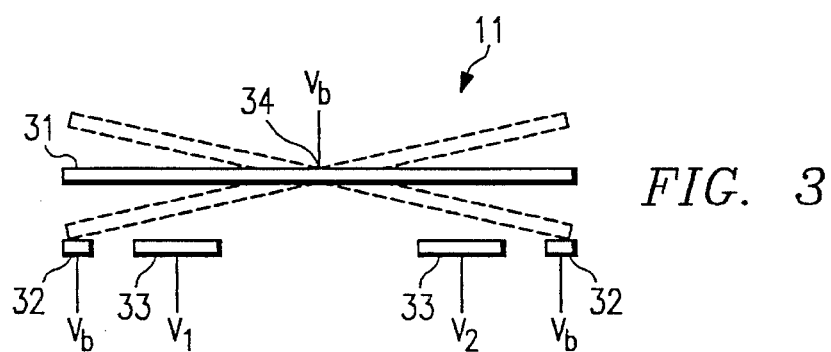
FIG. 3 illustrates the bistable operation of a mirror element of an SLM.

FIG. 3 is a cross sectional illustration of a single pixel element 11 of a typical DMD type of SLM 10. The spatial light modulation is provided by a reflective mirror 31, which tilts in either of two directions. The two stable states of mirror 31 are indicated by the dotted lines. In its stable positions, one end of mirror 31 has moved toward one of two landing electrodes 32. Two address electrodes 33 are connected to the outputs of the memory cell 12 whose fanout includes that pixel element 11. A reset voltage is applied to the conductive mirror 31 by means of a reset electrode 34. Address electrodes 33 are used to apply a voltage difference, such that one end of mirror 31 is attracted to its underlying electrode 33 and the other end is repelled. The reset voltage at electrode 34 determines whether the mirror 31 will actually rotate to the corresponding landing electrode 32. Thus, the mirror 31 are "loaded" via their memory cell 12 and reset via reset lines 13. If tilted in a selected direction, such as toward a display screen, a pixel element will be "on"; otherwise it is tilted so as to direct light elsewhere, such as to a trap.

Figure 4:
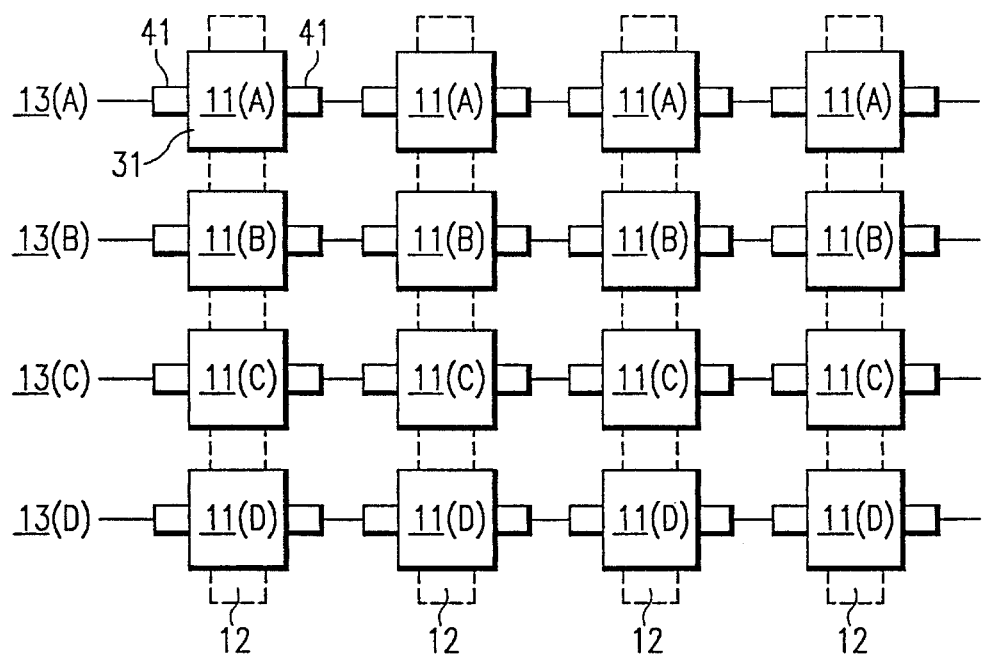
FIGS. 4 and 5 illustrate how reset lines can be easily connected for torsion-hinge type pixel element arrays having conductive mirrors and hinges.

FIG. 4 is a top plain view of a portion of an array of pixel elements 11, whose reset lines 13 are via torsion hinges 41. As in FIGS. 1 and 2 and as indicated by dotted lines, each pixel element 11 is associated with a memory cell 12 having a fanout of four pixel elements 11. In this embodiment, pixel elements 11 have conductive mirrors 31 and conductive torsion hinges 41 so that the reset can be applied directly to the mirrors 31 via the hinges 41 without special connections or isolations. In FIG. 4, where each mirror 31 has a pair of hinges 41 and where pixel elements 11 are aligned so that the hinges 41 are along horizontal lines, connections to reset lines 13 are easily made along these horizontal lines.

Figure 5:
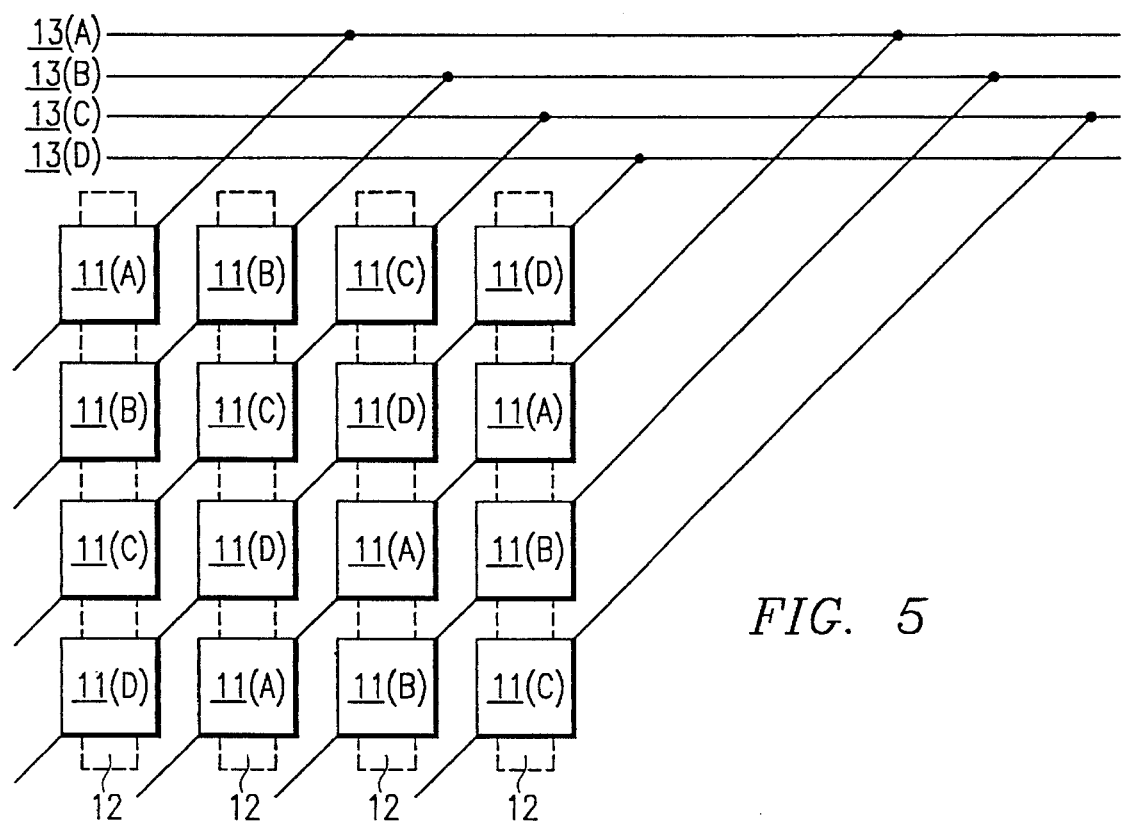

FIG. 5 illustrates an alternative arrangement of SLM 10. As in FIG. 4, the fanout of each memory cell 12 is a vertically spaced set of pixel elements 11. However, the reset connections are along diagonal reset lines 13. As in FIGS. 2 and 3, each pixel element 11 is labeled in terms of the reset line 13 to which it is connected, i.e. pixel element 11(A) is connected to reset line 13(A). This arrangement would be useful in SLMs 10 where it is advantageous to align pixel elements 11 such that their hinges 41 are along diagonal lines.

Operation of the Invention

For pulse width modulation, the operation of SLM 10 is generally consistent with existing pulse width modulation techniques in that an n-bit value represents the brightness of each pixel element 11 during a frame period. Each bit of the n-bit value represents a time during which the pixel element 11 is either on or off. The number of bits in the n-bit value is referred to herein as the "bit depth".

For purposes of example herein, it is assumed that each pixel element 11 displays light during one frame in accordance with a bit depth of 5 bits. Thus, for example four pixel elements 11 in a set associated with a single memory cell 12 might have the following data for a single frame:

|        |   |   |   |   |   |
|--------|---|---|---|---|---|
| pixel 1 | A | B | C | D | E |
| pixel 2 | F | G | H | I | J |
| pixel 3 | K | L | M | N | O |
| pixel 4 | P | Q | R | S | T |

, where {ABCDE} represents a 5-bit binary value. The value of each bit is "1" or "0" representing one of two possible states for the pixel element 11.

If it is assumed that a "1" in the LSB position represents an "on" value of one time unit, then a "1" in the MSB position will represents 16 time units, with the intermediate bits ranging downward as requiring 8, 4, and 2 time units. If bit 4 is the MSB, and bit 0 is the LSB, the times represented by each a "1" value of bit are:

|  |  |
|--|--|
| bit 4 (MSB) | 16 time units |
| bit 3 | 8 time units |
| bit 2 | 4 time units |
| bit 1 | 2 time units |
| bit 0 (LSB) | 1 time unit |

Thus, the greater the 5-bit value, the longer the pixel element 11 is on during a frame, and the brighter it is relative to other pixel elements 11 during that frame.

Further details about pulse width modulation techniques are described in U.S. patent Ser. No. 07/678,761, referred to in the background section of this patent application and incorporated herein by reference.

The pulse width modulation technique described herein makes use of the fact that some on or off times are long compared to the switching speed capability of memory cells 12. An underlying premise of the invention is that a single memory cell 12 may serve multiple pixel elements 11 if its data loading is sequenced so that no more than one of its pixel elements 11 needs resetting at the same time.

In general, the sequencing used to load each frame of data depends on fanout and the bit-depth. Various sequences are possible, but a rule that the sequencing must follow is that no two pixel elements 11 in a set can need loading at the same time.

Several "optional" rules, in addition to the rule of the preceding paragraph, may be applied. Where a fanout of m pixel elements is assumed, one such rule is that at the beginning of the sequence, all m pixel elements 11 are loaded in the first m time units. Thus, each pixel element 11 of each set is loaded in a continuous series of initial time slices. This rule results in good separation between frames, with a maximum skew of m time units between the end of one frame and the beginning of the next. Also, the data loaded during the first m-1 time slices should not be the LSB data. Finally, the data for any one pixel element 11 should begin and end in the same position relative to a frame. This is true because for a bit depth of n bits, the number of data units used for loading data is $2^n-1$ data units.

Figure 6:
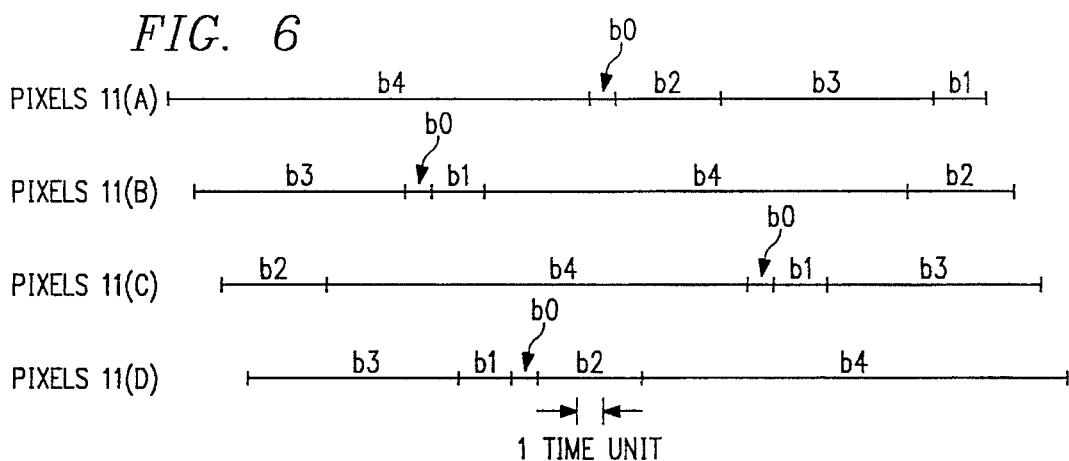
FIG. 6 is an example of a data sequence for loading a frame of data into an array of memory cells, each having a fanout of four pixel elements.

FIG. 6 illustrates an example of data sequencing for a memory cell 12 having a fanout of four, and applying all of the above rules. Thus, where m=4, and it is assumed that each loading step takes one time unit, the four pixel elements 11 associated with a memory cell 12 are loaded with the same data but only one pixel element 11 is reset. The pixel elements associated with a first reset line 13(A) are designated as pixel elements 11(A), etc.

The loading sequence of FIG. 6 is for 5-bit data frames as follows:

Load pixels 11(A), bit 4, and reset 13(A)
Load pixels 11(B), bit 3, and reset 13(B)
Load pixels 11(C), bit 2, and reset 13(C)
Load pixels 11(D), bit 3, and reset 13(D)
Skip 2 LSB time units
Load pixels 11(C), bit 4, and reset 13(C)
Skip 2 LSB time units
Load pixels 11(B), bit 0, and reset 13(B)
Load pixels 11(B), bit 1, and reset 13(B)
Load pixels 11(D), bit 1, and reset 13(D)
Load pixels 11(B), bit 4, and reset 13(B)
Load pixels 11(D), bit 0, and reset 13(D)
Load pixels 11(D), bit 2, and reset 13(D)
Skip 1 LSB time unit
Load pixels 11(A), bit 0, and reset 13(A)
Load pixels 11(A), bit 2, and reset 13(A)
Load pixels 11(D), bit 4, and reset 13(D)
Skip 2 LSB time units
Load pixels 11(A), bit 3, and reset 13(A)
Load pixels 11(C), bit 0, and reset 13(C)
Load pixels 11(C), bit 1, and reset 13(C)
Skip 1 LSB time unit
Load pixels 11(C), bit 3, and reset 13(C)
Skip 2 LSB time units
Load pixels 11(B), bit 2, and reset 13(B)
Load pixels 11(A), bit 1, and reset 13(A)
Skip 1 LSB time unit Buffering with a frame buffer (not shown) may be used to order the data in the correct sequence. A frame of data (the data that fills an array of SLM 10) is divided into four "split bit-frames". For the first split bit-frame, bit 4 for each pixel element 11(A) in each set associated with memory cells 12 would be appropriately ordered for loading during a time unit, such that ¼ of the SLM 10 is loaded. Then, all bit 3's for each pixel element 11(B) would be ordered as a second split bit-frame for loading, etc.

The overall effect of the data sequencing is that, for each frame, the entire array of pixel elements 11 is reset in groups of pixels, rather than all at once. Thus, resetting occurs in a "split reset" pattern, i.e., those pixel elements 11 connected to a single reset line 13 are switched at the same time.

Like prior pulse width modulation techniques, it takes $2^n-1$ LSB time units to display a full n-bit frame. However, each loading step is done with smaller increments of memory and can therefor be done in less time. In the example of this description, ¼ of a bit-frame is loaded for every reset signal. In other words, four reset signals are used per bit-frame. Each bit-frame, unlike those of prior pulse width modulation techniques, may display data from a different bit.

As a result of the loading technique of the invention, the peak data rate is reduced. Also, although loading occurs more frequently per frame, the higher valued bits no longer coincide for all pixel elements 11. Thus, there are no long waits during the display time of these higher valued bits. The average data rate and the peak data rate more closely converge.

The maximum fanout per memory cell 12 depends on the bit depth. Where the bit depth is n, the theoretical maximum fanout may be calculated as:

$$fanout_{max} = \frac{2^n-1}{n}$$

The numerator of the above equation represents that there are $2^n-1$ time slices per frame. The denominator indicates that each fanout requires n events.

Computer programs may be developed and used to determine appropriate sequences for varying bit depths and fanouts. A rule-based program will prevent violations of the above-stated rule that prohibits more than one pixel element 11 in a set from needing resetting at one time, as well as other optional rules.

An enhanced method of the invention combines the above-described "split reset" process with a "block clearing". Block clearing has been used with prior pulse width modulation schemes to avoid the problem of having to load an entire bit-frame during a LSB time unit. For block clearing, bit-frames are loaded in whole multiples of a LSB time unit. A mechanism is provided on the SLM 10 to allow all pixel elements 11 to be quickly "cleared", i.e., switched to an "off" state. Thus, those bit-frames whose "on" times are less than the time required for loading can be given their appropriate weight. The total number of time units in a frame exceeds the maximum brightness time by the number of time units used for clearing. Thus, the consequence of having pixel elements 11 in an "off" state during part of loading is a reduction in optical efficiency of the SLM 10. The general aspects of block clearing are described in U.S. Ser. No. 07/678,761.

Fault Tolerance

Figure 7:
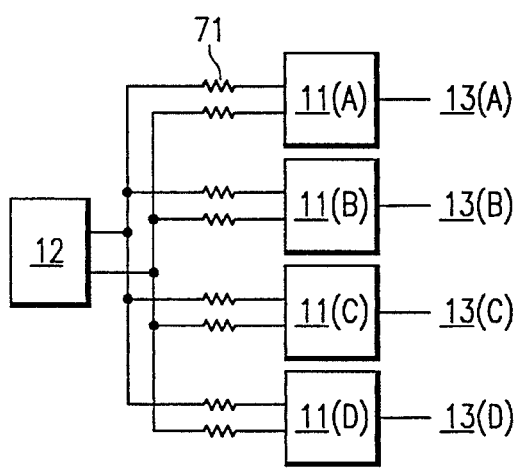
FIGS. 7–9 illustrate enhanced embodiments for providing improved fault tolerance.

FIG. 7 illustrates an enhancement of the SLM 10 of FIGS. 1–5, especially with respect to the interconnections between each memory cell 12 and the pixel elements 11 in its fanout. A resistive element, in this case a resistor 71, is included in each data connection for reducing the impact of a failure at any one pixel element 11. For example, a short at one of the pixel elements 11 will not cause the rest of the pixel elements 11 in the set to fail.

As stated above, a feature of many SLMs 10 is that they are easily fabricated using integrated circuit processes. In these types of SLMs 10, resistors 71 could be fabricated from a polysilicon material. Alternatively, a highly resistive material could be used for the electrode contacts. Also, as an alternative to extra resistive areas or elements, the entire fabrication level for pixel element electrodes, such as the electrodes 33 of FIG. 3, could be made from a material, such as titanium nitride or titanium oxynitride, having a high sheet resistance.

Figure 8:
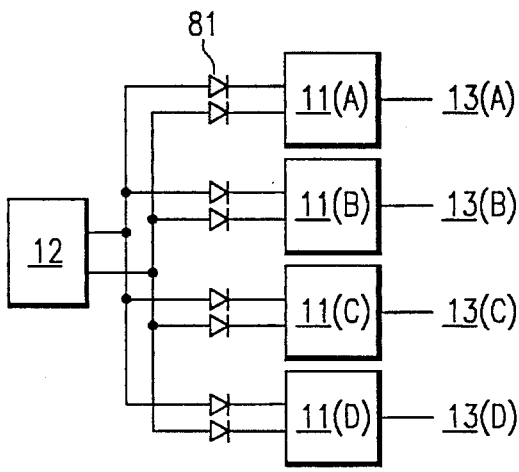

FIG. 8 illustrates another fault-tolerant enhancement of SLM 10. Instead of resistors 71, diodes 81 are used as a resistive element to isolate a fault at any one pixel element 11.

Figure 9:
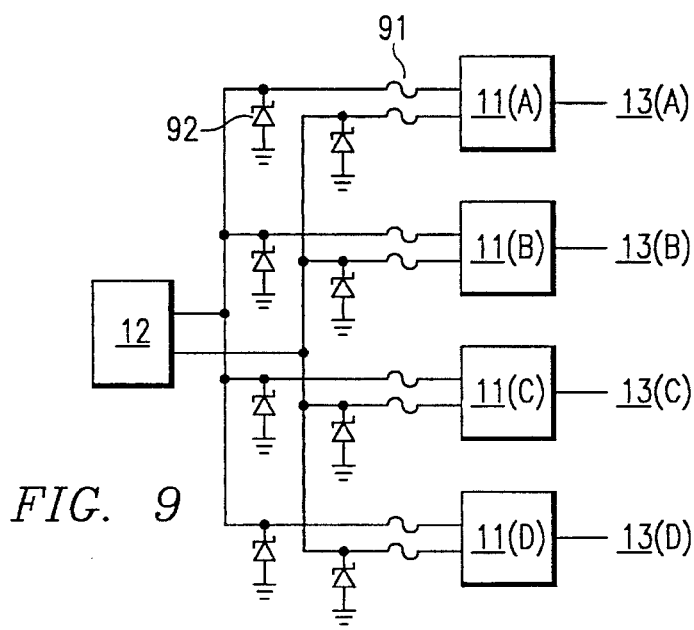

FIG. 9 illustrates a third fault-tolerant enhancement. Fuses 91 are designed to "blow" if there is a shorted pixel element 11. Zener diodes 92 or some other type of breakdown diode provides a high resistance to ground.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of pulse-width modulating frames of multi-bit frame data used by a spatial light modulator, having an array of pixel elements, comprising the steps of:

dividing the time to display each frame of data into equal time units;

dividing a frame of data into split bit-frames, each split bit-frame containing data for pixel elements connected to an associated reset line;

delivering data representing said split bit-frame of data to memory cells, wherein each memory cell is connected to a set of said pixel elements and receives a data bit representing an on or off state of only one of its pixel elements;

loading said pixel elements, by using each memory cell to apply a data signal representing the data bit received by that memory cell to its associated pixel elements;

switching said pixel elements, by using a reset signal to change the state of all pixel elements connected to said reset line;

repeating the above delivering, loading, and switching steps for each split bit-frame of data within a data frame.

2. The method of claim 1, wherein the first loading step coincides with the beginning of a frame time period.

3. The method of claim 1, wherein the pixel elements connected to each reset line receive at least one split bit-frame containing a higher valued bit before receiving a split bit-frame containing the least significant bit.

4. The method of claim 1, wherein said dividing step is performed such that each time slice represents the display time for a least significant bit of data of each data value.

5. The method of claim 1, wherein said loading step and all repeated loading steps are performed such that each pixel element of a set is loaded during a continuous series of initial time slices.

6. The method of claim 1, wherein said loading step is performed so that the data for any one pixel element in each set begins and ends in the same position relative to each frame.

* * * * *